US00H002134H

(19) United States
(12) Statutory Invention Registration
Jean et al.
(10) Reg. No.: US H2134 H
(43) Published: Dec. 6, 2005

(54) APPARATUS AND METHOD FOR FORMING POLYMER CRUMB

(75) Inventors: Rong-Her Jean, Sugar Land, TX (US); Chin-Yuan George Ma, Sugar Land, TX (US)

(73) Assignee: Shell Oil Company, Houston, TX (US)

(21) Appl. No.: 10/137,147

(22) Filed: May 2, 2002

(65) Prior Publication Data

US 2003/0205335 A1 Nov. 6, 2003

(51) Int. Cl.[7] ..... B01D 1/00

(52) U.S. Cl. ..... 159/16.3; 159/2.1; 159/47.1; 203/88; 523/324; 523/340; 528/501

(58) Field of Search ..... 159/2.1, DIG. 10, 159/16.3, 47.1, 18; 203/88; 523/324, 340; 528/501; 165/146, 147, 167

(56) References Cited

U.S. PATENT DOCUMENTS

| | | | | |
|---|---|---|---|---|
| 3,202,647 A | | 8/1965 | Todd et al. | 260/94.7 |
| 3,724,522 A | * | 4/1973 | Pogson | 159/13.3 |
| 3,804,145 A | | 4/1974 | Arnold et al. | 159/48 R |
| 3,841,381 A | * | 10/1974 | Dassesse et al. | 159/2.1 |
| 5,453,158 A | * | 9/1995 | Cummings et al. | 159/47.1 |

* cited by examiner

*Primary Examiner*—Harvey E. Behrend

(57) ABSTRACT

The present invention provides a contractor apparatus and method for removing solvent from a polymer cement. The resulting polymer is substantially free of solvent and exhibits improved oil absorption and lower fines. In one aspect, a contractor is provided including a cylindrical casing having a high pressure section, a convergence section, a high velocity section, a divergence section, and a discharge section. The polymer cement is introduced into the high pressure section to significantly and unexpectedly improve solvent removal. The convergence and divergence sections have cross-sectional areas that correspond to an effective angle from about 4° to about 65°, such as 6°. The polymer cement is mixed with high pressure steam. After converging, the polymer cement forms more uniform droplets due to high shear of steam. In the divergence and discharge sections, the polymer is substantially devolatized.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR FORMING POLYMER CRUMB

BACKGROUND OF THE INVENTION

1. Field of the Invention

Embodiments of the invention relate to an improved apparatus and method for removing solvent from polymer cement. More particularly, embodiments of the invention relate to a more efficient apparatus and method for devolatilizing polymer cement.

2. Background of the Related Art

Subsequent to a solution polymerization process, the polymer is often isolated from the solvent as a polymer crumb. A typical method of isolation for polymers, such as conjugated diene polymers and copolymers, utilizes a high shear mixer whereby the polymer solution or "cement" is combined with high-pressure steam in a mixing zone of a cylindrical tube. The temperature of the steam is above the maximum boiling point of the solvent and below the temperature at which the polymer shows evidence of decomposition under the conditions of high shear contact. The ratio of steam to solution and the residence time in the mixing zone are sufficient to vaporize at least 90% of the solvent. The sheared mixture is then passed into a cyclone separation zone wherein the polymer is separated from the steam and any vaporized solvent. A detailed description of this process can be found in U.S. Pat. No. 3,804,145, entitled "Process For The Isolation And Recovery Of Polymers", issued on Apr. 16, 1974, which is incorporated by reference herein.

A high shear contactor having a central zone with an adjustable flow constrictor mounted therein is also described in '145. The cement is fed through an opening into a high shear, annular space formed by the constrictor within the central zone. The cement is contacted with steam in the annular space where the solvent begins to vaporize. The mixture of steam, vaporized solvent, and polymer then exit the open end of the contactor at near sonic speeds.

In contrast, U.S. Pat. No. 3,202,647, entitled "Elastomer Recovery Process", teaches a process for recovering elastomers from hydrocarbon solutions wherein the steam and polymer cement are mixed together and injected into the bottom of a hot water vessel by a steam jet system. The steam ejector described in '647 is generally in the configuration of a converge-diverge shape such as the construction of a Penberthy steam ejector. The system description taught by U.S. Pat. No. 3,202,647 is also incorporated by reference herein.

While the foregoing designs are adequate for separating certain polymer cements from solvent, the designs are less efficient for removal of solvent from high molecular weight block copolymers. In particular, typical contactors, like those described above, result in polymer crumb having high solvent content, poor oil absorption, poor particle size distribution and poor porosity when forming crumb of an elastomeric block polymer having a large hydrogenated block of a conjugated diene and two polystyrene end blocks.

In addition to unacceptably high solvent content, typical contactors are inefficient in their use of steam. Steam consumption is a major expense in a commercial polymer finishing operation. To achieve sufficient solvent removal in a typical contactor, a steam to cement weight ratio of about 1.2:1.0 to 1.5:1.0 is required. In other words, for every pound of polymer cement treated in a typical contactor, 1.2 to 1.5 lbs of high pressure steam is consumed.

Therefore, there is a need for a method and apparatus for separating a polymer from its solvent which results in more efficient solvent removal.

SUMMARY OF THE INVENTION

An improved method and apparatus for separating polymer from solvent using high pressure steam is provided. In one aspect, a contactor is provided that includes a cylindrical casing having a high pressure section, a convergence section, a high velocity section, a divergence section, and a discharge section. The contactor also includes an insert having multiple diameters that form various annular regions therein to provide a change in cross-sectional area corresponding to an effective angle from about 4° to about 65°, such as 6°. The polymer cement is introduced into the high pressure section where it mixes with the steam and begins to form into droplets. The convergence and divergence sections are tapered to provide a change in cross-sectional area corresponding to an effective angle from about 4° to about 65°, such as 6°. The high pressure section forms a uniform droplet size and prevents the mixture from flashing or devolatizing prematurely. After the mixture passes through the high velocity section, the mixture reaches a supersonic speed creating a near vacuum in the divergence section, allowing the polymer cement to devolatilize. As the flashing mixture continues to flow through the divergence section and into the discharge section, the flashing solvent is substantially separated from the polymer.

In another aspect, a method for separating solvent from a polymer cement in a contactor apparatus is provided. The method introduces high pressure steam and a polymer cement into a first section of a contactor having a substantially constant cross-sectional area where the steam and polymer cement are mixed. The mixture then flows through a second section having a converging cross-sectional area corresponding to an effective angle of convergence from about 40° to about 65°, such as 6°. The mixture then flows through a third section having a substantially constant cross-sectional area followed by a fourth section having a diverging cross-sectional area corresponding to an effective angle of divergence from about 40° to about 65°, such as 6°. The solvent is flashed from the polymer in the fourth section and the mixture flows through a discharge section having a substantially constant cross-sectional area before recovering a polymer substantially free of the solvent.

In yet another aspect, a method for separating solvent from a polymer cement is provided. The method includes separating residual solvent from the polymer cement within a contactor; and devolatizing the polymer cement within a hot water coagulator. The contactor having a first section having an inlet for the polymer cement; a second section having a converging cross-sectional area that corresponds to an effective angle of convergence between about 4° and about 65°; a third section having a smaller cross-sectional area in comparison to the first section; a fourth section having a diverging cross-sectional area that corresponds to an effective angle of divergence between about 4° and about 65°; and a discharge section having a larger cross-sectional area in comparison to the third section.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawing. It is to be noted, however, that the appended drawing illustrates only typical embodiments of this invention and is therefore not to be considered limiting of its scope, for the invention may admit to other equally effective embodiments.

DETAILED DESCRIPTION OF THE PREFERRED EMBODIMENT

Figure 1:
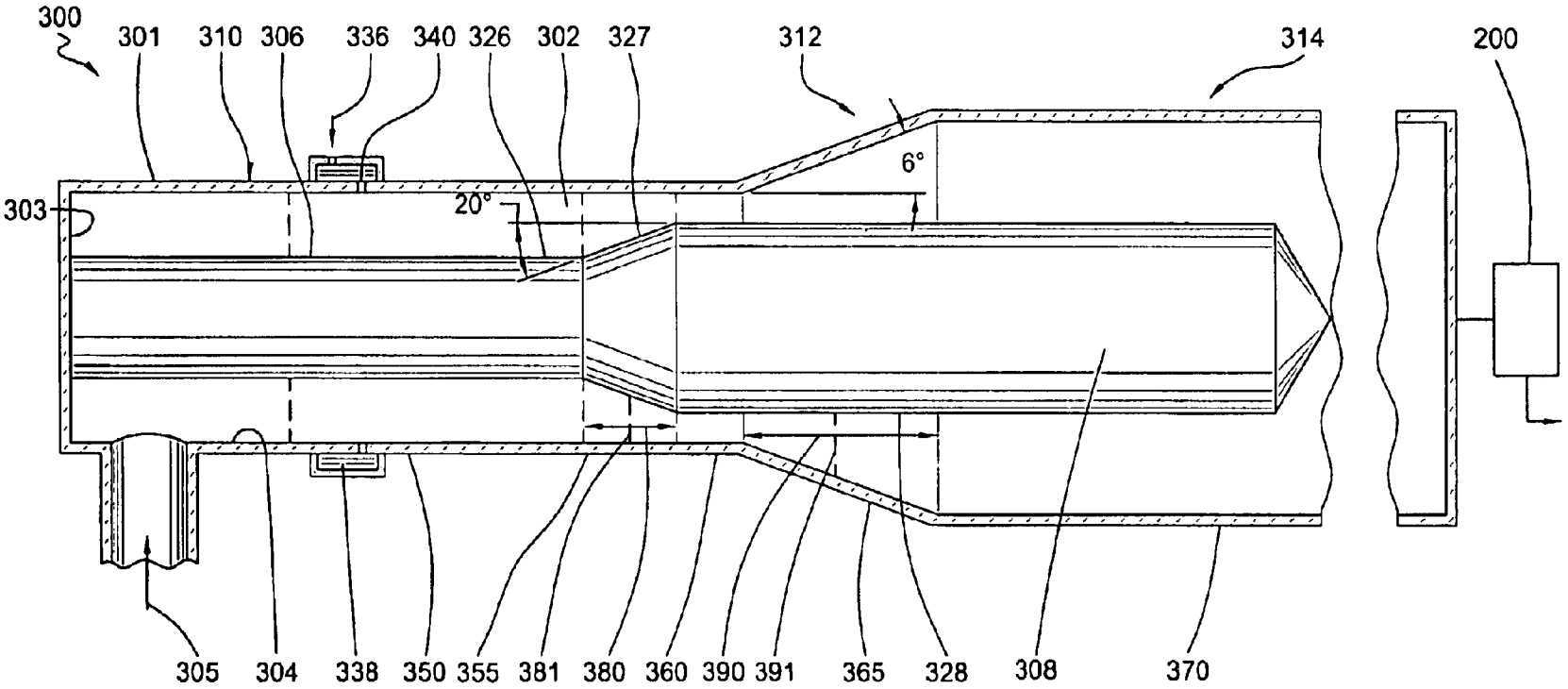
FIG. 1 is a cross section view of a contactor according to embodiments of the invention described below.

FIG. 1 shows a cross section view of a contactor 300 according to the present invention. The contactor 300 includes a tubular casing having a first portion 310, a second portion 312, and a third portion 314. The contactor 300 further includes an insert 308 positioned within the casing 301. The insert 308 has a first portion 326, a second portion 327, and a third portion 328. The insert 308 can either extend through an end wall 303 of the contactor 300 near a steam inlet 305 as shown, or can be held in place with one or more spacers (not shown).

The second portion of the casing 312 and the second portion of the insert 327 each have an increasing outer diameter. The first portion of the casing 310 and the first portion of the insert 326 each have a constant outer diameter. Similarly, the third portion of the casing 314 and the third portion of the insert 327 have a constant outer diameter.

The insert 308 and the surrounding casing 301 form an annulus 302 defined by an inner wall 304 of the casing 301 and an outer wall 306 of the insert 308. The annulus 302 includes five sections that correspond to the changing diameters of the casing 301 and the insert 308 described above. More particularly, the annulus 302 includes a high pressure section 350; a convergence section 355; a high velocity section 360; a divergence section 365; and a discharge section 370.

The high pressure section 350 is formed within the annular space between the constant inner diameter of the first portion 310 of the casing 301 and the constant outer diameter of the first portion 326 of the insert 308, and has a substantially constant cross-sectional area. The term "substantially constant" as used herein, refers to an effective angle of convergence or divergence of the cross-sectional area less than about 4°.

The convergence section 355 is formed within the annular space between the constant inner diameter of the first portion 310 of the casing 301 and the increasing outer diameter of the second portion 327 of the insert 308. The convergence section 355 has a converging cross-sectional area with an effective angle of convergence from about 4° to about 65°, such as from about 6°.

The high shear section 360 is formed within the annular space between the constant inner diameter of the first portion 310 of the casing 301 and the constant outer diameter of the third portion 328 of the insert 308. The high shear section 360 has a substantially constant cross-sectional area.

The divergence section 365 is formed within the annular space between the increasing inner diameter of the second portion 312 of the casing 301 and the constant outer diameter of the third portion 328 of the insert 308. The divergence section 365 has a diverging cross-sectional area with an effective angle of divergence from about 4° to about 65°, such as about 6°.

The discharge section 370 is formed within the annular space between the constant inner diameter of the third portion 314 of the casing 301 and the constant outer diameter third portion 328 of the insert 308. The discharge section 370 also has a substantially constant cross sectional area.

The high pressure section 350 includes a cement entry port 336 where the polymer cement is fed into the contactor 300. The cement entry port 336 is rounded, squared, slotted, or has any other cross-sectional geometry, and is located anywhere along the first section 350. In one aspect, the cement entry port is located from about 4 inches to about 7 inches from the start of the convergence section 355. In another aspect, the inlet port 336 introduces the polymer cement into an annular space 338 that directs the polymer cement through a slot 340 around the casing 301, as shown in FIG. 1. The width of the slot 340 can be adjusted to provide the desired pressure drop of from about 10 psi to about 60 psi.

The high velocity section 360 has a ratio of length to diameter ranging from about 8 to about 12. The high velocity section 360 provides a flow restriction/constriction to achieve sonic velocity at an end thereof so that a super sonic velocity is achieved at a beginning of the divergence section 365. The ratio of the cross-sectional area of the high pressure section 350 to the cross sectional area of the high velocity section ranges from about 5 to about 7. The ratio of the cross-sectional area of the discharge section 370 to the cross-sectional area of the high velocity section 360 ranges from about 15 to about 30.

The convergence section 355 has a length 380 and a decreasing inner diameter 381. The decreasing inner diameter 381 provides a decreasing cross-sectional area that corresponds to an effective angle of convergence from about 4° to about 65°, such as about 6°.

The divergence section 365 has a length 390 and an inner increasing diameter 391. The increasing inner diameter 391 provides an increasing cross-sectional area that corresponds to an effective angle of divergence from about 4° to about 65°, such as about 6°.

FIG. 1 also shows a hot water coagulator 200 in fluid communication with the contactor. An exemplary hot water coagulator 200 is shown and described in U.S. Pat. No. 3,202,647, entitled "Elastomer Recovery Process", which was discussed above and incorporated by reference herein. In operation, high-pressure steam flows through the first portion 310 of the casing 301 while a polymer cement is fed through the inlet port 336. The pressure of the steam at the contactor 300 is 100 psig to 450 psig, such as 150 psig to 350 psig. Accordingly, the temperature of the steam at the contactor 300 is between about 335° F. and about 550° F., such as between about 365° F. and about 550° F., and such as between about 400° and 550° F. The pressure drop across the inlet port 336 is designed to be in a range from about 10 psi to about 60 psi to control the initial cement drop size.

The cement concentration may vary from about 5 percent polymer to about 60 percent polymer by weight. The cements may also vary from about 5 percent polymer to about 25 percent polymer by weight. The cement concentration may further vary from about 10 percent polymer to about 20 percent polymer by weight.

Within the high pressure 350 and convergence sections 355, the steam and cement are mixed and intimately contacted. The ratio of steam to cement which enters downstream processing equipment via the high shear mixer may vary from about 0.3:1.0 to about 1.5:1.0. The lower limit is determined by the problem of obtaining discrete particles. The maximum ratio is determined by economics and the ability of the down-stream processing equipment to remove the solvent vapor and steam. At steam to cement ratios substantially lower than 0.3:1.0, the polymer no longer forms discrete particles but forms large agglomerates. The higher the steam to cement ratio in the contactor 300, the smaller the particle size. This size is somewhat dependent on polymer/solvent type, cement concentration and steam temperature. Acceptable particle sizes have been achieved at steam/cement ratios from about 0.3:1.0 to about 1.5:1.0, such as between about 0.5:1.0 and about 1.5:1.0, and such as between about 0.5:1.0 and about 0.8:1.0.

As the cement and steam are mixed, solvent droplets begin to form due to the shearing effect from the high-speed steam. As the mixture flows into the high velocity section 360, the cement droplets are broken up and a relatively uniform distribution of droplets is established. The material accelerates to supersonic speed as it flows through the high velocity section 360 and enters the divergence section 365. Due to the sudden enlargement of volume within the divergence section 365, a near vacuum is created by pressure differential. This sudden pressure drop results in a rapid de-volatilization of the solvent, and a sufficient separation of the flashing solvent from the polymer crumb. The separated solvent and polymer crumb then flow through the coagulator 200 for further devolitization.

This polymer recovery method is useable with any polymer/solvent cement system that can withstand the high temperature steam without decomposing or cross-linking. It is especially good with polyolefin/hydrocarbon cements, polyalkenyl aromatic polymers/inert solvent cements, polyconjugated diene polymer/hydrocarbon cements, copolymers and block-polymers of conjugated diene and alkenyl aromatic hydrocarbons in inert solvents and the hydrogenated and partially hydrogentated derivatives of the above co-polymers and block polymers in inert solvents. The cements are the two and multiblock alpha alkenyl aromatic hydrocarbon/conjugated diene polymers and selectively or totally hydrogenated derivatives of said block polymers dissolved in hydrocarbon solvents having relatively low boiling points such as alkenes, alkanes, arenes, cycloalkenes, or cycloalkanes. These include for example, mixed pentenes, mixed pentanes, cyclohexane, toluene, and mixtures thereof, the only criterion being that the solvent employed in the apparatus and process of the invention have a maximum boiling point such that it is readily vaporized upon contact with steam of a given temperature. Exemplary cements are the polystyrene/polybutadiene, polystyrene/polyisoprene, polystyrene/polybutadiene/polystyrene, polystyrene/polyisoprene/polystyrene block copolymers, or their hydrogenated or partially hydrogenated derivatives.

The contactor geometry allows a certain residence time at a high shear rate to produce a polymer product substantially free of residual solvent and water. The lower the water level, the more easily the polymer is dried. Water is produced by the condensation of steam used to flash the solvent from the cement. The low residual solvent means that the polymer is less sticky, thus enabling a dry handling method. The high shear annular space in the high velocity sections as well as the length of the diverging sections determine the shear rate and the residence time. As the length of the diverging sections is increased, the residence time under shearing conditions is also increased thus allowing more time for the cement de-volatization.

The contactor geometry also minimizes steam consumption without adversely affecting the quality of the polymer product. Steam represents a large expense in any de-volatilization process. In prior art contactors, the relation of steam to cement has been about 1.2 to 1.5 pounds of steam for every pound of cement, producing a polymer having low fines with an oil absorption rate (OAR) less than 58. The apparatus described herein devolatizes polymer cement in a near vacuum; therefore, the apparatus consumes considerably less steam without sacrificing or otherwise adversely affecting the quality of the product. For example, the contactor as shown in FIG. 1 uses steam on the order of 0.6 pounds of steam for every pound of cement, a savings of 50 to 60% compared to the prior art. The resulting polymers also exhibit low fines, similar to the prior art produced polymers, but more significantly, the resulting polymers have an OAR greater than 58. The term "OAR" as used herein refers to the rate of 150 parts of oil absorbed per hundred pounds of rubber (phr) measured after one minute. An OAR greater than 58 corresponds to greater than 96% absorption within one minute.

While foregoing is directed to the preferred embodiment of the present invention, other and further embodiments of the invention may be devised without departing from the basic scope thereof, and the scope thereof is determined by the claims that follow.

What is claimed is:

1. A contactor for separating the solvent from the polymer in a polymer cement, said contactor comprising:

(a) a tubular casing comprising (i) a first section having a constant outer diameter, an inlet for the polymer cement, and means for the introduction of steam, whereby said polymer cement and said steam are mixed together and droplets of solvent begin to form; and (ii) a second section of increasing inner diameter such that said second section has a diverging cross-sectional area with an effective angle of divergence of about 6°; and (iii) a third section having a constant inner diameter and means for discharging said polymer and said solvent which have been separated from the polymer cement; and (b) an insert positioned within the tubular casing such that an annulus is formed between the tubular casing and the insert to allow flow of said polymer cement, droplets of said solvent, and steam through the annulus, said insert comprising (i) a first portion having a constant outer diameter and which is positioned such that it extends in said first section of the tubular casing; and (ii) a second portion which has an increasing outer diameter and which is positioned within said first section of the tubular casing to provide the annulus with a converging cross-sectional area that corresponds to an effective angle of convergence of about 6°; and (iii) a third potion having a constant outer diameter and which is positioned within said first, second and third sections of the tubular casing to provide the annulus with 1) a high shear section with a substantially constant cross-sectional area between said first section of the tubular casing and said third portion of the insert wherein the velocity of the polymer cement, droplets of steam, and steam flowing through the annulus increases to supersonic speed and a uniform distribution of droplets is established; and 2) a diverging cross-sectional area, between said second section of the tubular casing and said third portion of the insert, that corresponds to an effective angle of divergence of about 6°, whereby the pressure within the annulus drops such that a vacuum is created by the pressure differential, resulting in rapid de-volatilization of the solvent, thus providing separation of the solvent from the polymer.

* * * * *